3,551,385
AROMATIC POLYAMIDES FROM
DIAMINOBENZILS
Hartwig C. Bach, Durham, N.C., assignor to Monsanto
Company, St. Louis, Mo., a corporation of Delaware
No Drawing. Filed Dec. 30, 1965, Ser. No. 517,813
Int. Cl. C08g 20/00
U.S. Cl. 260—63          6 Claims

ABSTRACT OF THE DISCLOSURE

Novel polymers have been prepared from condensation of aromatic diacid halides and 4,4′-diaminobenzil. The polymers are useful for the formation of temperature resistant fibers.

---

This invention relates to aromatic polyamides and, more particularly, to the provision and preparation of aromatic polyamides from diaminobenzils.

The monomeric compound 4,4′-diaminobenzil,

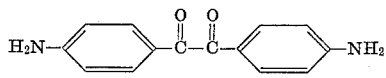

is well known, having first been prepared by G. W. Anderson in U.S. 2,359,280. Apparently, however, it has been subjected to very little experimentation and neither it nor its isomers has, so far as is known, been used to prepare high molecular weight aromatic polyamides by reacting them with difunctional aromatic acid halides.

It is an object of this invention to provide new compositions of matter which consist of aromatic polyamides prepared from diaminobenzils and an aromatic diacid halide.

Another object is to provide a process for the preparation of 4,4′-dinitrobenzil which gives higher yields and is easier to operate than prior art processes.

Yet another object of the invention is to provide fibers, filaments, and films from the aromatic polyamides of the invention.

Other objects and advantages of the invention will become apparent from the following description.

It has been found that aromatic polyamides having the general formula

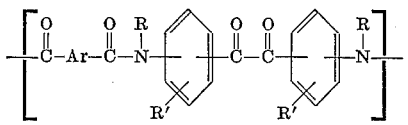

wherein Ar represents a bifunctional aromatic ring system characterized by benzenoid unsaturation, R is hydrogen or lower alkyl of 1 to 6 carbon atoms, and R′ is hydrogen, lower alkyl of 1 to 6 carbon atoms, aryl or any other substituent group which is inert under the polymerization conditions of the invention, can be prepared by reacting diaminobenzils wherein the amino and carbonyl groups are not attached to adjacent carbon atoms with aromatic diacid halides under suitable condensation reaction conditions.

The preparation of the aromatic polyamides of the invention may be by interfacial or solution polymerization methods according to the teachings of the prior art. A representative polymerization reaction sequence is as follows:

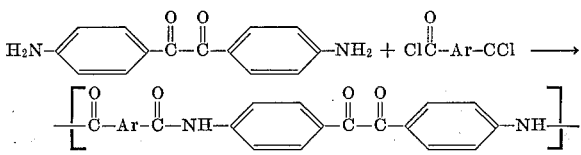

In this reaction Ar has the significance previously indicated.

The solution polymerization method typically involves mixing the diamine with a suitable solvent which is inert to the polymerization reaction and adding the diacid chloride as a solid or in solution. The same solvents may be employed for both diamine and diacid chloride. Among such solvents there may be mentioned dimethyl acetamide, 1-methyl-2-pyrrolidone, 1,5-dimethyl-2-pyrrolidone, hexamethyl phosphoric triamide and the like. These solvents are rendered more effective in many instances by mixing them with a small amount, up to 10%, of an alkali or alkaline earth salt, such as lithium chloride, lithium bromide, magnesium bromide, magnesium chloride, or calcium chloride. The preferred solvent for solution polymerization is dimethyl acetamide. The diamine solution is cooled to between 0° C. and −20° C. and the diacid chloride is added either as a solid or in a solution of one of the afore-mentioned solvents. The mixture is then stirred for a period of time until polymerization is substantially complete and a high viscosity is obtained. This highly viscous solution may be spun per se or the polymer may be isolated by pouring the mixture into a non-solvent, washing and drying the polymer and then preparing a spinning solution.

Where an interfacial polymerization reaction is desired it is conducted by mixing water, an emulsifier and the diamine, preferably in the form of its dihydrochloride. A proton acceptor is then added and the mixture is stirred rapidly. During this rapid stirring the diacid halide, preferably in an inert organic solvent, is added. The mixture is stirred until polymerization is complete, with the polymer being isolated by filtration, followed by washing and drying. The diacid halide solvent may be any convenient one such as a cyclic non-aromatic oxygenated organic solvent like tetramethylenesulfone, 2,4 - dimethyltetramethylenesulfone, tetrahydrofuran, propylene oxide and cyclohexanone. Further suitable diacid halide solvents include chlorinated hydrocarbons such as methylene chloride, chloroform and chlorobenzene, benzene, nitrobenzene, benzonitrile, acetophenone, toluene and mixtures of these solvents such as tetrahydrofuran and benzonitrile, tetrahydrofuran and acetophenone, or benzene and chloroform and the like.

The amounts of the various reactants which may be employed will of course vary according to the type of polymer desired; however, in most instances substantially equal molar quantities or a slight excess of diamine to diacid halide may be used. For interfacial polymerization reactions sufficient proton acceptor to keep the acidic by-products neutralized is added, the exact amount being easily determined by one skilled in the art.

Suitable emulsifying agents for interfacial polymerization include compounds such as sodium lauryl sulfate, nonylphenoxy(ethyleneoxy)-ethane, the sodium or potassium salt of any suitable condensed sulfonic acid and the like.

The proton acceptors which act as acid scavengers to neutralize HCl as formed during the reaction include sodium carbonate, magnesium carbonate, calcium carbonate, tertiary amines such as triethylamine, trimethylamine, tri-n-propylamine, ethyldimethylamine, tributylamine and similar compounds which react as desired.

Suitable diaminobenzils which may be polymerized with aromatic diacid halides by the process of the invention include 4,4′-diaminobenzil, 3,3′-diaminobenzil, 3,4′-diaminobenzil and the like.

Previously, the preparation of diaminobenzils such as 4,4′-diaminobenzil was made difficult because of the cumbersome and expensive routes available for preparing the intermediate dinitro compounds. For example, 4,4′- dinitrobenzil has been prepared by nitration of either hydrobenzoin or diphenyl glyoxalone as reported by F. D. Chattaway in J. Chem. Soc. 1928, 1361. Both of these processes give low yields of the desired 4,4'-dinitrobenzil partly because of the formation of other isomers and involve a complicated operation. A new method for the preparation of 4,4'-dinitrobenzil has been developed which involves nitration of 4,5-diphenylimidazole at elevated temperatures:

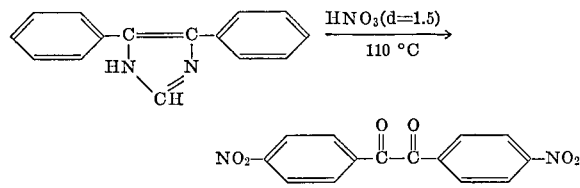

This route is less complicated and gives higher yields of the desired 4,4'-dinitrobenzil than the prior art method.

The aromatic diacid halides which are useful in the practice of the invention include any and all of the well known terephthalic and isophthalic acid halides. For example, isophthaloyl chloride, terephthaloyl chloride, and substituted derivatives thereof such as lower alkyl, lower alkoxy, halogen, nitro, phenyl and carbalkoxy substituted terephthaloyl and isophthaloyl chlorides.

Other aromatic acid halides such as multiple and fused ring diacid chlorides including 2,6-naphthalene carbonyl chloride and 4,4'-dibenzoyl chloride may also be used. In essence, any of the aromatic diacid chlorides of the prior art as illustrated and exemplified in U.S. 2,989,495 and containing from about 6 to 15 or more carbon atoms may be used.

The thermal stability of the polymers of the invention is surprising in view of the fact that the presence of the two carbonyl groups linked together normally would have been expected to have caused the softening point and the thermal stability of the polymers to be much lower than what was actually found.

Polymers of this invention are useful in a wide variety of end use applications including the production of fibers, filaments, films and other shaped articles.

The invention is further illustrated by the following examples in which all parts and percents are by weight unless otherwise indicated.

EXAMPLE I

Preparation of 4,4'-dinitrobenzil

A 77.7 gram portion of 4,5-diphenylimidazole was slowly added to 255 ml. of fuming nitric acid while the mixture was cooled externally by an ice bath. The solution was then heated to reflux temperatures, ca. 86° C., over a 1½ hour period and refluxed for five hours. The product was isolated by pouring the cooled reaction mixture on ice, filtering the product, washing it with a total of 2 l. of water and recrystallizing it from 275 ml. of dimethylacetamide. A yellow material (60.7 g.), M.P.=212–213° C., was obtained.

Analysis.—Calcd. for $C_{14}H_8N_2O_6$ (percent): C, 56.0; H, 2.68; N, 9.32. Found (percent): C, 56.2; H, 2.56; N, 9.78.

EXAMPLE II

Preparation of 4,4'-diaminobenzil

A mixture of 30.0 g. of 4,4'-dinitrobenzil, 0.5 g. of Pd/C (5% Pd), and 120 ml. of dimethylacetatmide was hydrogenated in the Parr hydrogenator without external heating for three hours. After removal of the catalyst, the solution was poured into 1 liter of water. The precipitated, yellow product (19.1 g.) was filtered off, washed with water and dried. A sample, recrystallized from methanol, had a melting point of 168.5–169.5° C.

Analysis.—Calcd. for $C_{14}H_{12}N_2O_2$ (percent): C, 69.9; H, 5.04; N, 11.66. Found (percent): C, 69.7; H, 5.71; N, 11.52.

EXAMPLE III

Polyisophthalamide of 4,4'-diaminobenzil

A stirred solution of 4,4'-diaminobenzil (0.720 g.) in 10 ml. of dimthylacetamide (5% LiCl) was cooled under nitrogen to —30° C. Then isophthaloyl chloride (0.609 g.) was added. The reaction mixture was stirred 15 minutes at —30° C., 15 minutes at 0° C. and 2 hours at room temperature. The resulting viscous dope was diluted with 20 ml. of dimethylacetamide (5% LiCl), then coagulated in 200 ml. of water. A yellow material (1.15 g. was obtained. Inherent viscosity (0.5% solution in dimethylacetamide/5% LiCl): 0.93.

EXAMPLE IV

Polyterephthalamide of 4,4'-diaminobenzil

A stirred solution of 4,4'-diaminobenzil (0.53 g.) in 8 ml. dimethylacetamide (5% LiCl) was cooled under nitrogen —30° C. Then terephthaloyl chloride (0.43 g.) was added. The reaction mixture was stirred 15 minutes at —30° C., 15 minutes at 0° C., 3 hours at room temperature. Lithium hydroxide (0.106 g.) was added to the viscous dope, which was subsequently diluted with 20 ml. dimethylacetamide and coagulated in 250 ml. of water. A yellow material (0.825 g.) was obtained. A clear film was cast from a 16% solution of the polymer in dimethylacetamide (5% LiCl). The film softened on a hot pin in air at 400° C., slowly degraded at 450° C. Inherent viscosity of the polymer (0.5% solution in dimethylacetamide/5% LiCl): 0.97. A solution of the polymer in DMAc (5% LiCl) spun into water yielded fiber. The fibers were successfully hand-drawn at 240° over a hot pin.

EXAMPLE V

Polybibenzamide of 4,4'-diaminobenzil

A stirred solution of 4,4'-diaminobenzil (0.720 g.) in 10 ml. dimethylacetamide (5% LiCl) was cooled to —30° C., then bibenzoyl chloride (0.837 g.) was added. The reaction mixture was stirred 15 minutes at 30° C., 15 minutes at 0° C., then 3 hours at room temperature. After dissolution of LiOH (0.204 g.) the dope was diluted with 20 ml. dimethylacetamide, then coagulated in 300 ml. of water. A yellow material (1.31 g.) was obtained. The polymer darkens somewhat at 365° C., does not melt upon heating to 420° C. Inherent viscosity (0.5% solution in dimethylacetamide/5% LiCl): 0.64.

EXAMPLE VI

Poly(2,6-naphthalene-dicarbonamide) of 4,4'-diaminobenzil

A stirred solution of 4,4'-diaminobenzil (0.72 g.) in 10 ml. dimethylacetamide (5% LiCl) was cooled under nitrogen to —30° C., then 2,6-naphthalenedicarbonyl chloride (0.759 g.) was added. The reaction mixture was stirred 15 minutes at —30° C., 15 minutes at 0° C., one hour at room temperature. Dimethylacetamide/5% LiCl (5 ml.) was added, and stirring was continued for 2 hours. After dissolution of LiOH (0.204 g.), the dope was coagulated in 300 ml. of water. A yellow material (1.21 g.) was obtained; it darkens somewhat at 420° C., but does not melt. Inherent viscosity (0.5% solution in dimethylacetamide/5% LiCl): 1.05. A solution of the polymer in DMAc (5% LiCl) spun into water yielded fibers. The fibers were successfully drawn at 240° over a hot pin.

The foregoing detailed description has been given for clearness of understanding only, and unnecessary limitations are not to be construed therefrom. The invention is not to be limited to the exact details shown and described since obvious modifications will occur to those skilled in the art, and any departure from the description

I claim:
1. A fiber-forming aromatic polyamide consisting essentially of recurring structural units having the formula

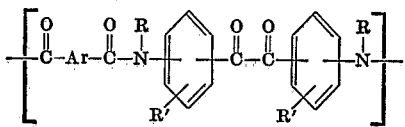

wherein Ar is a divalent carbocyclic aromatic radical, R is hydrogen or lower alkyl and R' is hydrogen, lower alkyl or other inert substituent group.

2. The polyamide of claim 1 wherein the benzene rings of the formula are para oriented.

3. A fiber-forming polymer consisting essentially of recurring structural units having the formula

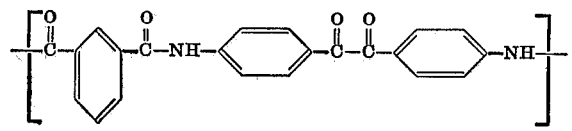

4. A fiber-forming polymer consisting essentially of recurring structural units having the formula

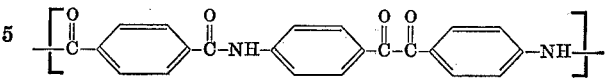

5. A fiber-forming polymer consisting essentially of recurring structural units having the formula

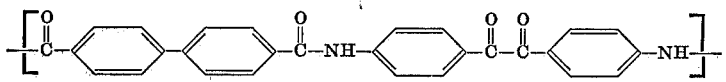

6. A fiber-forming polymer consisting essentially of recurring structural units having the formula

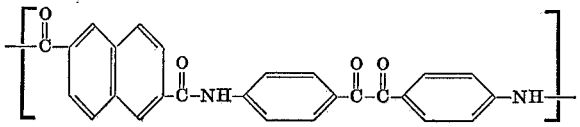

References Cited
UNITED STATES PATENTS
3,094,511  6/1963  Hill et al. _____ 260—78
3,354,123  11/1967  Morgan _____ 260—78

HAROLD D. ANDERSON, Primary Examiner

U.S. Cl. X.R.
260—30.2, 30.6, 32.6, 78